(12) United States Patent
Bakker et al.

(10) Patent No.: US 9,439,122 B2
(45) Date of Patent: Sep. 6, 2016

(54) METHOD FOR PERFORMING A HANDOVER OF A MOBILE DEVICE

(75) Inventors: Hajo Bakker, Eberdingen (DE); Lutz Ewe, Stuttgart (DE); Markus Gruber, Korntal-Munchingen (DE)

(73) Assignee: Alcatel Lucent, Boulogne-Billancourt (FR)

( * ) Notice: Subject to any disclaimer, the term of this patent is extended or adjusted under 35 U.S.C. 154(b) by 11 days.

(21) Appl. No.: 13/981,961

(22) PCT Filed: Dec. 20, 2011

(86) PCT No.: PCT/EP2011/073368
§ 371 (c)(1),
(2), (4) Date: Jul. 26, 2013

(87) PCT Pub. No.: WO2012/100882
PCT Pub. Date: Aug. 2, 2012

(65) Prior Publication Data
US 2013/0310043 A1    Nov. 21, 2013

(30) Foreign Application Priority Data
Jan. 28, 2011 (EP) .................................. 11290057

(51) Int. Cl.
*H04W 36/22* (2009.01)
*H04W 28/08* (2009.01)
*H04W 36/30* (2009.01)

(52) U.S. Cl.
CPC ............. *H04W 36/22* (2013.01); *H04W 28/08* (2013.01); *H04W 36/30* (2013.01)

(58) Field of Classification Search
CPC ........... H04W 28/02; H04W 28/0284; H04W 28/0289; H04W 28/08; H04W 36/00–36/0022; H04W 36/0033; H04W 36/0044; H04W 36/0083–36/0094; H04W 36/08; H04W 36/16–36/165; H04W 36/22; H04W 36/24–36/385

USPC ............. 455/419–420, 422.1, 436–438, 440, 455/442–443, 450, 453, 456.1, 456.5; 370/230, 237, 331–334
See application file for complete search history.

(56) References Cited

U.S. PATENT DOCUMENTS 6,690,939 B1 * 2/2004 Jonsson et al. ............... 455/453
7,860,510 B2  12/2010 Kroth et al.
(Continued)

FOREIGN PATENT DOCUMENTS

CN          1666560 A     9/2005
JP       2001-078242 A    3/2001
(Continued)

OTHER PUBLICATIONS

K. Dimou et al., "Handover within 3GPP LTE: Design Principles and Performance," Internet Citation, XP002588902, 5 pages, Sep. 23, 2009.
(Continued)

*Primary Examiner* — George Eng
*Assistant Examiner* — Umair Ahsan
(74) *Attorney, Agent, or Firm* — Fay Sharpe, LLP (57) ABSTRACT

The invention relates to a method for performing a handover of a mobile device from a source cell to a target cell in a cellular wireless telecommunication network, the method comprising the following steps: configuring the mobile device to transmit a first handover trigger signal to the source cell, when a difference between a signal strength of the target cell and a signal strength of the source cell as measured by the mobile device is above a first threshold (105; determining (S1) if a cell traffic load in the source cell is above a cell traffic load threshold; if so, configuring the mobile device to transmit a second handover trigger signal to the source cell, when a difference between a signal strength of the target cell and a signal strength of the source cell as measured by the mobile device is above a second threshold (100), wherein the first threshold is larger than the second threshold.

14 Claims, 3 Drawing Sheets

(56) References Cited

U.S. PATENT DOCUMENTS

| | | | |
|---|---|---|---|
| 8,583,118 B2 | 11/2013 | Lee | |
| 2005/0221828 A1* | 10/2005 | Wakuta et al. | 455/437 |
| 2005/0239460 A1* | 10/2005 | Kroth et al. | 455/434 |
| 2006/0293060 A1 | 12/2006 | Yang et al. | |
| 2009/0080342 A1* | 3/2009 | Frederiksen et al. | 370/253 |
| 2009/0137251 A1* | 5/2009 | Ji et al. | 455/437 |
| 2009/0163223 A1 | 6/2009 | Casey | |
| 2010/0142486 A1* | 6/2010 | Wahlqvist et al. | 370/332 |
| 2010/0267387 A1 | 10/2010 | Stephens | |
| 2011/0128862 A1* | 6/2011 | Kallin et al. | 370/245 |
| 2013/0095817 A1* | 4/2013 | Karla et al. | 455/422.1 |

FOREIGN PATENT DOCUMENTS

| | | |
|---|---|---|
| JP | 2007-251586 A | 9/2007 |
| JP | 2008-270919 A | 11/2008 |
| JP | 2010-268476 A | 11/2010 |
| WO | WO 2009/064553 A1 | 5/2009 |
| WO | WO 2009/099224 | 8/2009 |

OTHER PUBLICATIONS

Huawei, : Handover parameter exchange, $3^{rd}$ Generation Partnership Project (3GPP), 3GPP TSG-RAN WG3 Meeting #65bis, Tdoc R3-092336, XP050391864, 4 pages, Miyazaki, Japan, Oct. 12-15, 2009.

Ericsson, "Restructuring of HO settings adaptation chapter," $3^{rd}$ Generation Partnership Project (3GPP), 3GPP TSG-RAN3 Meeting #66, R3-093081, XP050392541, 4 pages, Jeju, Korea, Nov. 9-13, 2009.

"$3^{rd}$ Generation Partnership Project; Technical Specification Group Radio Access Network; Evolved Universal Terrestrial Radio Access (E-UTRA) and Evolved Universal Terrestrial Radio Access Network (E-TRAN): Overall description; Stage 2 (Release 10)," 3GPP TS 36.300 V10.2.0, XP050462130, pp. 1-200, Dec. 18, 2010.

International Search Report for PCT/EP2011/073368 dated Mar. 12, 2012.

* cited by examiner

METHOD FOR PERFORMING A HANDOVER OF A MOBILE DEVICE

FIELD OF THE INVENTION

The invention relates to the field of wireless telecommunications networks, particularly to a handover of a mobile device in a wireless telecommunication network.

BACKGROUND AND RELATED ART

According to the Long-Term Evolution (LTE) Standard a wireless telecommunication network has to work without soft handovers. This means that only a source cell and a target cell are involved in a handover procedure of a mobile device from the source cell to the target cell.

WO 2009/064553 A1 describes a base station for a cellular communication system comprising a transceiver which receives measurement reports from a plurality of user equipments served by the base station. The measurement reports comprise receive signal quality indication for neighbour cells of the base station. An overlap processor determines a cell overlap indication for each of a set of neighbour cells in response to the receive signal quality indications and a handover control processor performs handover control in response to the cell overlap indications.

SUMMARY

It is an object of the present invention to provide an improved method for performing a handover of a mobile device, an improved base station, and an improved computer-readable storage medium.

This object is achieved by the method, the base station and the computer-readable storage medium according to the independent claims. Embodiments of the invention are given in the dependent claims.

The invention relates to a method for performing a handover of a mobile device from a source cell to a target cell in a cellular wireless telecommunication network. First a traffic load is determined in the source cell. This is preferably performed by the base station of the source cell. If the traffic load in the source cell is above a traffic load threshold, the base station of the source cell configures mobile devices being connected to the source cell to transmit a second handover trigger signal when a difference between a signal strength of the target cell and the signal strength of the source cell is above a second threshold. The signal strengths are measured by the respective mobile device.

In other words, the mobile device is configured such that a second handover trigger signal is transmitted from the mobile device to the source cell, if the traffic load in the source cell is above the traffic load threshold, and if a difference between the signal strength of the target cell and the signal strength of the source cell is above the second threshold.

Then, it is determined if a handover of the mobile device form the source cell to the target cell shall be performed. This determination is triggered by the second handover trigger signal received by the source cell. For this determination the base station of the source cell may for example check the resources used by the mobile device. In case the resources consume more than a configurable amount of resources in the source cell, a handover command could be sent to the mobile device.

A handover of the mobile device from the source cell to the target cell is performed, if it has been determined to perform the handover by the base station of the source cell. A first handover trigger signal is transmitted from the mobile device to the source cell, if no second handover trigger signal has been transmitted previously from the mobile device. Another condition for transmitting the first handover trigger signal is that a difference between the signal strength of the target cell and the signal strength of the source cell is above a first threshold. The first threshold is larger than the second threshold. A handover of the mobile device is then performed from the source cell to the target cell when the first handover trigger signal is received by the base station of the source cell.

Two thresholds for the difference between the signal strength of the target cell and the signal strength of the source cell are configured for transmitting handover trigger signals. The second handover trigger signal is only transmitted when a high traffic load in the source cell is determined by the base station of the source cell. In this case the base station of the source cell configures the mobile devices connected to the source cell to transmit the second handover trigger signal when the difference between the signal strengths is above the second threshold. The second threshold is smaller than the first threshold. Hence, the second handover trigger signal is always transmitted before the first handover trigger signal.

After receiving the second handover trigger signal the base station of the source cell may for example determine the amount of resources consumed by the mobile device. If the mobile device consumes more than a resource threshold the handover command is sent from the base station of the source cell to the mobile device. The second handover trigger signal can be used for load balancing. According to embodiments of the invention it is not necessary to adjust the handover parameters completely when load balancing is necessary due to a high traffic load in the source cell.

Embodiments of the invention are advantageous because the handover parameters do not need to be adjusted in case of a high traffic load in the source cell. Load balancing is performed by configuring the mobile devices connected to the source cell such that they transmit the second handover trigger signal in case of a high traffic load. Mobile devices consuming many resources can be handed over to the target cell at the time point of the second handover trigger signal, while mobile devices consuming less resources may be handed over at a later point of time, namely the point of time when the first handover trigger signal is received.

Having two different thresholds for mobile devices consuming different amounts of resources is advantageous, because the mobile devices consuming less resources may be handed over later, which leads to a higher handover success rate, because the signal strength of the target cell is higher when the first handover trigger signal is received by the base station of the source cell.

According to embodiments of the invention the traffic load generated by the mobile device in the source cell is determined by the base station of the source cell. It is further determined if the traffic load generated by the mobile device is higher than a mobile device traffic load threshold. The step of determining if a handover of the mobile device shall be performed after receiving the second handover trigger signal comprises in this embodiment the determination if the traffic load generated by the mobile device in the source cell is higher than the mobile device traffic load threshold when the second handover trigger signal is received by the base station of the source cell. If so, it is determined that the handover shall be performed. If the traffic load is not higher than the mobile device traffic load threshold, no handover is performed after reception of the second handover trigger signal.

According to embodiments of the invention the traffic load generated by the mobile device in the source cell is determined by a minimum bitrate required by the mobile device. The minimum bitrate may for example be determined by the mobile device and transmitted to the base station of the source cell. The mobile device may for example determine the minimum bitrate by determining an amount of that data to be sent or to be received. When the mobile device determines a higher amount of data to be received and/or to be sent a higher minimum bitrate is transmitted to the base station of the source cell. A lower minimum bitrate is transmitted to the source cell when less data is to be received and/or to be sent. Alternatively the determination of the minimum bitrate can also be performed by the base station of the source cell. In this case the mobile device transmits an indicator for the amount of data to be sent and/or to be transmitted to the base station, which then determines the minimum bitrate as described above.

According to embodiments of the invention the second handover trigger signal is indicative of at least one cell being located in the vicinity of the mobile device. The at least one cell comprises the target cell. In other words, the mobile device transmits the cells being located near the mobile device, which means the cells with the highest signal strength together with the second handover trigger signal. The base station of the source cell may then determine that a handover to one of these cells is performed.

According to embodiments of the invention a location of the mobile device is determined by the base station of the source cell. The second handover trigger signal is transmitted only if the location of the mobile device lies outside of a center region of the source cell. The location may for example be determined by a global positioning satellite system or by a measurement of the timing advance of signals being exchanged between the mobile device and the base station of the source cell.

The center region of the source cell may for example be defined by a maximum distance to the base station of the source cell. In this case the center region of the source cell would be a circle. However, other definitions of the center region are also possible. For example, the center region may be a geographic region such as a street within a city, or a place with low mobile device density.

The base station of the source cell configures in this case the mobile device to transmit the first handover signal only if the location of the mobile device lies outside the center region of the source cell. The base station of the source cell may for example determine that the mobile device is located outside the center region and then the base station will transmit a signal to the mobile device, wherein the signal is indicative of configuring the mobile device such that the second handover trigger signal is transmitted if the difference of the signal strengths of the source cell and the target cell is bigger than the second threshold.

According to embodiments of the invention the second threshold is increased when the traffic load in the source cell decreases. The second threshold is decreased when the traffic load in the source cell increases. This dynamic behavior of the second threshold is advantageous for adjusting the threshold according to the traffic load conditions in the source cell. Each time the threshold is adjusted a signal is transmitted from the base station of the source cell to the mobile device, wherein the signal is indicative of the new threshold value. Load balancing can be performed in this way without changing the handover parameters completely. Changing the threshold frequently allows a very good adjustment of the load balancing to the traffic load. Changing the threshold less frequently has the advantage of less messages transmitted from the base station of the source cell to the mobile device for indicating a change of the second threshold.

According to embodiments of the invention the traffic load in the source cell is determined by using waiting factors for scheduling a plurality of mobile devices in the source cell. The plurality of mobile devices comprises the mobile device. The waiting factors for scheduling the mobile devices are dependent on a relation of a required minimum bitrate to a transmission bitrate of the mobile devices or dependent on a ratio of the required minimum bitrate and the transmission bitrate of the mobile devices.

So-called token counters (TC), i.e. weighting factors for scheduling of mobile devices, can be used for the purpose of system load monitoring. A token counter is used to ensure a minimum bit rate (MBR) for each mobile device, i.e. an operator can ensure a minimum degree of service to all mobile devices.

The token counters of the mobile devices are internally forwarded in a base station to a token counter load monitoring function for processing of the traffic load in the source cell. The output of the token counter load monitoring function can be used e.g. by the base station internal connection admission control or for the communication between base stations for load indication and load balancing functions.

For each time interval or time slot, as e.g. a 1 ms transmission time interval (TTI) in the standard Third Generation Partnership Project Long Term Evolution (3GPP LTE), a scheduler allocates resources to a mobile device, as e.g. physical resource blocks (PRB) in LTE, which can be interpreted as a bit rate.

When a mobile device gets allocated a bit rate below its required minimum bit rate, the token counter grows in this time slot. On the other hand, if the mobile device gets allocated a bit rate above its required minimum bit rate, the token counter decreases in this time slot. The token counter (TC) is limited between 0<TC<maximum value. Therefore, the distribution of mobile device specific token counters in a cell provides a good indication of the load relative to the effective capacity of the cell. The actual value of the cell capacity is not needed because the token counter reflects the grade to which mobile device demands can be satisfied.

In case of a cell overload, i.e. when many mobile devices can no longer be served with the required minimum bit rate, the token counter of said mobile devices will increase.

In case of an empty mobile device buffer, i.e. if there is no need to schedule said mobile device, the token counter values of said mobile device will preferably not be taken into account by the token counter load monitoring function.

The calculation of token counters can be part of the base station scheduler or implemented as a specific token counter software module inside the base station in case the scheduler algorithm does not support a token counter mechanism. In the latter case, the required input parameters, i.e. the mobile device bit rate calculated from the scheduled data stored within the base station buffer, are provided by the scheduler to the token counter software module.

The most important parameter for the token counter mechanism is the required minimum bit rate MBR. A mobile device will always receive this rate, because otherwise the token counter grows and strongly increases the scheduling weight of this user. In the equation for the token counter given above, the minimum bit rate MBR is multiplied with the period of time of a transmission time interval $t_{TTI}$ to be able to compare it with the data bits allocated to the user in this subframe. It is important to state that the requirement of the minimum bit rate does not need to be met in each transmission time interval $t_{TTI}$, but in the long term. This flexibility is important to be able to exploit the diversity in the channel conditions of different mobile devices in order to increase the total cell capacity.

In order to use the distribution of token counters as a load indication, a threshold for a quantile of a distribution of said token counters, i.e. weighting factors for scheduling of mobile devices, is defined above which the base station is in overload.

In an embodiment of the invention, more than one threshold for a quantile can be defined in order to have a measure for gradually increasing load which can be represented by different load indicators.

In another embodiment, simply a threshold for the value of the probability density function at a dedicated value of the token counter is defined, above which the base station is in overload. In an alternative of the embodiment, more than one threshold for the value of the probability density function at a dedicated value of the token counter can be defined in order to have a measure for gradually increasing load which can be represented by different load indicators.

By means of using token counters for load monitoring and control, a reliable detection of overload situations is possible. Furthermore, no additional overhead in terms of additional processing costs or additional measurement capabilities are needed.

According to embodiments of the invention the resources used by the mobile device are determined and it is determined if the used resources exceed a resource threshold. If so it is determined that a handover of the mobile device from the source cell to the target cell shall be performed upon reception of the second handover trigger signal by the base station of the source cell. It is to be noted that in any embodiment of this invention the base station of the source cell may be different from the base station of the target cell or identical to the base station of the target cell.

According to embodiments of the invention information about the mobile device is stored that the handover has been performed from the source cell to the target cell after reception of the second handover trigger signal, if the handover has been performed after the second handover trigger signal. In other words, information is stored that the mobile device was handed over from the source cell to the target cell due to load balancing. When such information is stored a handover back from the target cell to the source cell is made less likely. The handover can for example be made less likely by the base station of the target cell. The base station of the target cell could configure the mobile device such that the threshold for transmitting a handover trigger signal is increased for signals received by the mobile device from the source cell.

According to embodiments of the invention the information is generated by the source cell and stored in the base station of the source cell. The information may then be transmitted from the source cell to the target cell and stored in the base station of the target cell.

Alternatively the information is stored in the mobile device and transmitted from the mobile device to the base station of the target cell after the handover from the source cell to the target cell.

According to embodiments of the invention the information is transmitted in a history list of the mobile device from the source cell to the target cell. The handover from the target cell back to the source cell is made less likely if the second last visited cell in the history list is the source cell.

Embodiments of the invention are advantageous for avoiding handovers being performed permanently between the source cell and the target cell due to load balancing in both cells. If the mobile device has been handed over from the source cell to the target cell due to load balancing reasons a handover back to the source cell is made less likely. For example a handover back to the source cell due to load balancing reasons in the target cell is avoided. In general, information has to be transmitted from the source cell or the mobile device to the target cell that the mobile device has been handed over to the target cell due to load balancing reasons. The target cell stores this information and uses the information for making handovers back to the source cell less likely.

According to embodiments of the invention additional information is transmitted together during the handover procedure triggered by the second handover trigger signal from the source cell to the target cell. The additional information transmitted from the source cell to the target cell comprises the second threshold of the source cell and/or the traffic load in the source cell. The target cell determines to accept the handover using the second threshold and/or the traffic load in the source cell. The base station of the target cell makes its acceptance decision for the handover request dependent on the severity of the overload in the source cell. For example, if the target cell is also overloaded, a handover due to load balancing reasons may not be accepted. If the overload in the source cell is considered as higher than the overload in the target cell a handover may be accepted anyway.

The first threshold is a value indicative for the traffic load because the second threshold may be adjusted according to the traffic load in the source cell.

In another aspect the invention relates to a base station apparatus. The base station apparatus comprises means for determining a traffic load in a source cell. The source cell is served by the base station apparatus. The base station apparatus further comprises means for configuring a mobile device to transmit a second handover trigger signal to the base station apparatus if the traffic load in the source cell is above a traffic load threshold and if the difference between the signal strengths of a target cell and a signal strength of the source cell is above a second threshold. The signal strengths are measured by the mobile device.

Further, the base station apparatus comprises means for receiving the second handover trigger signal from the mobile device and means for determining if a handover of the mobile device from the source cell to a target cell shall be performed when the second handover trigger signal is received by the base station apparatus. The base station apparatus further comprises means for performing a handover of the mobile device from the source cell to the target cell and means for receiving a first handover trigger signal from the mobile device. The means for performing a handover are adapted for performing the handover after reception of the second handover trigger signal and after reception of the first handover trigger signal.

In yet another aspect the invention relates to a computer-readable storage medium comprising instructions that when executed by a base station apparatus according to embodiments of the invention cause the base station apparatus to perform a method according to embodiments of the invention.

BRIEF DESCRIPTION OF THE DRAWINGS

In the following embodiments of the invention are explained in greater detail, by way of example only, making reference to the drawings in which.

DETAILED DESCRIPTION

Like numbered elements in these Figs. are either identical elements or perform the same function. Elements which have been discussed previously will not necessarily be discussed in later Figs. if the function is identical.

Figure 1:
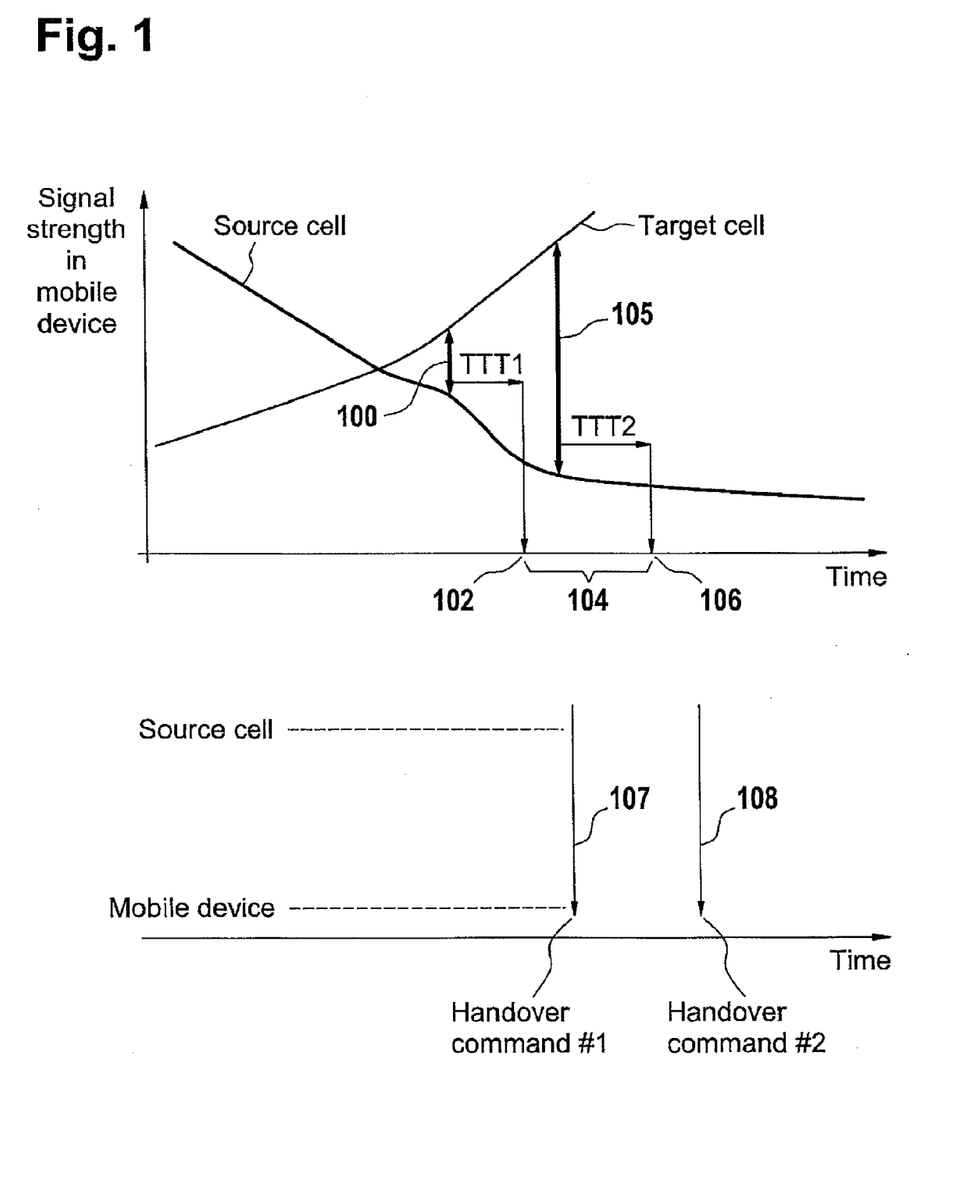
FIG. 1 is a schematic diagram of signal strengths of a source cell and a target cell and thresholds for transmitting a first and a second handover trigger signal.

FIG. 1 is a schematic diagram showing the signal strengths of a source cell and a target cell in dependency of the time. The x-axis represents the time and the y-axis represents the signal strengths. The depicted signal strengths correspond to a mobile device being moved away from the source cell towards the target cell. The signal strength of the target cell increases in time while the signal strength of the source cell decreases in time. At a first time point the signal strength of the target cell is higher than the signal strength of the source cell and the difference between the signal strength of the target cell and the signal strength of the source cell is higher than a second threshold 100. A first time to trigger TTT1 starts at this time point and at the end of TTT1 the second handover trigger signal is transmitted from the mobile device to the source cell. The second handover trigger signal is transmitted at time point 102.

After time point 102 time period 104 starts. This is the time period when the base station of the source cell determines if a handover of the mobile device shall be performed to the target cell. In this time period the base station of the source cell considers the traffic load in the source cell and the traffic load generated by the mobile device. Only if the handover shall be carried out based on load balancing a first handover command (#1)107 is sent from the source cell to the mobile device.

The mobile device transmits a first handover trigger signal when the difference of the signal strength of the target cell and the signal strength of the source cell is above a first threshold 105. A second time to trigger TTT2 starts at this time point and at the end of TTT2 the first handover trigger signal is transmitted from the mobile device to the source cell. The first handover trigger signal is transmitted at time point 106

If the handover was not carried out based on load balancing a second handover command (#2)108 is sent from the source cell to the mobile device.

The aforementioned second threshold is only applied when the source cell suffers a high traffic load. When the source cell has a low traffic load only the first threshold is used for performing a handover to the target cell. The second threshold is used for load balancing. An adjustment of handover parameters for load balancing reasons is not anymore necessary.

Figure 2:
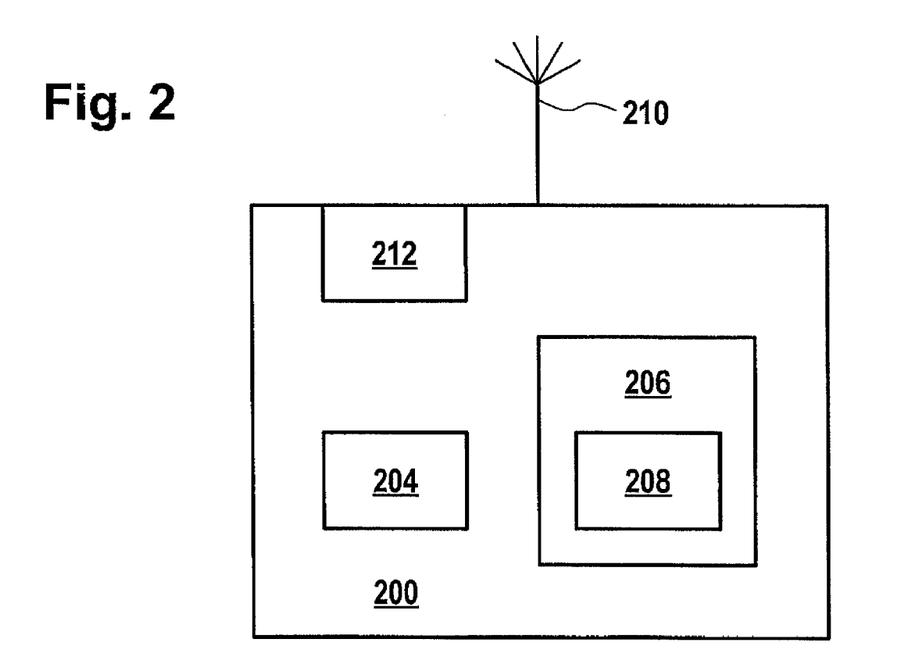
FIG. 2 is a block diagram of a base station apparatus according to embodiments of the invention.

FIG. 2 is a block diagram of a base station apparatus 200. The base station apparatus 200 comprises a processor 204, a data storage 206, and an antenna 210. The processor 204 is adapted to read computer-readable program instructions 208 stored in data storage 206. Further, the base station 200 is adapted to exchange signals with a mobile device via antenna 210. The base station apparatus 200 further comprises an interface 212 for exchanging signals with another base station apparatus. A traffic load in the source cell may for example be determined by processor 204 executing program instructions 208. Processor 204 is also adapted for transmitting a signal via antenna 210 to a mobile device. The signal configures the mobile device to transmit a second handover trigger signal to the base station apparatus 200 if the traffic load in the source cell is above a traffic load threshold and if a difference between a signal strength of a target cell and a signal strength of the source cell is above a second threshold. It is to be noted that the source cell is served by the base station apparatus 200. The target cell may also be served by the base station apparatus 200 although this is not necessary.

The base station apparatus 200 can receive signals from the mobile device via antenna 210. When the second handover trigger signal is received from the mobile device via antenna 210 processor 204 determines if a handover of the mobile device to the target cell shall be performed. The processor 204 may consider in this step the general traffic load in the source cell and the traffic load generated by the mobile device. When the processor 204 determines that a handover shall be performed to the target cell a signal is transmitted from the source cell via antenna 210 to the mobile device the signal being indicative for performing the handover. Additionally a signal being indicative for performing the handover is transmitted to the target cell. If the target cell is served by another base station, this signal is transmitted via interface 212.

A first handover trigger signal may be received from the mobile device via antenna 210 and processor 204 may then transmit signals to the mobile device and to the base station of the target cell as explained above for the second handover trigger signal.

Figure 3:
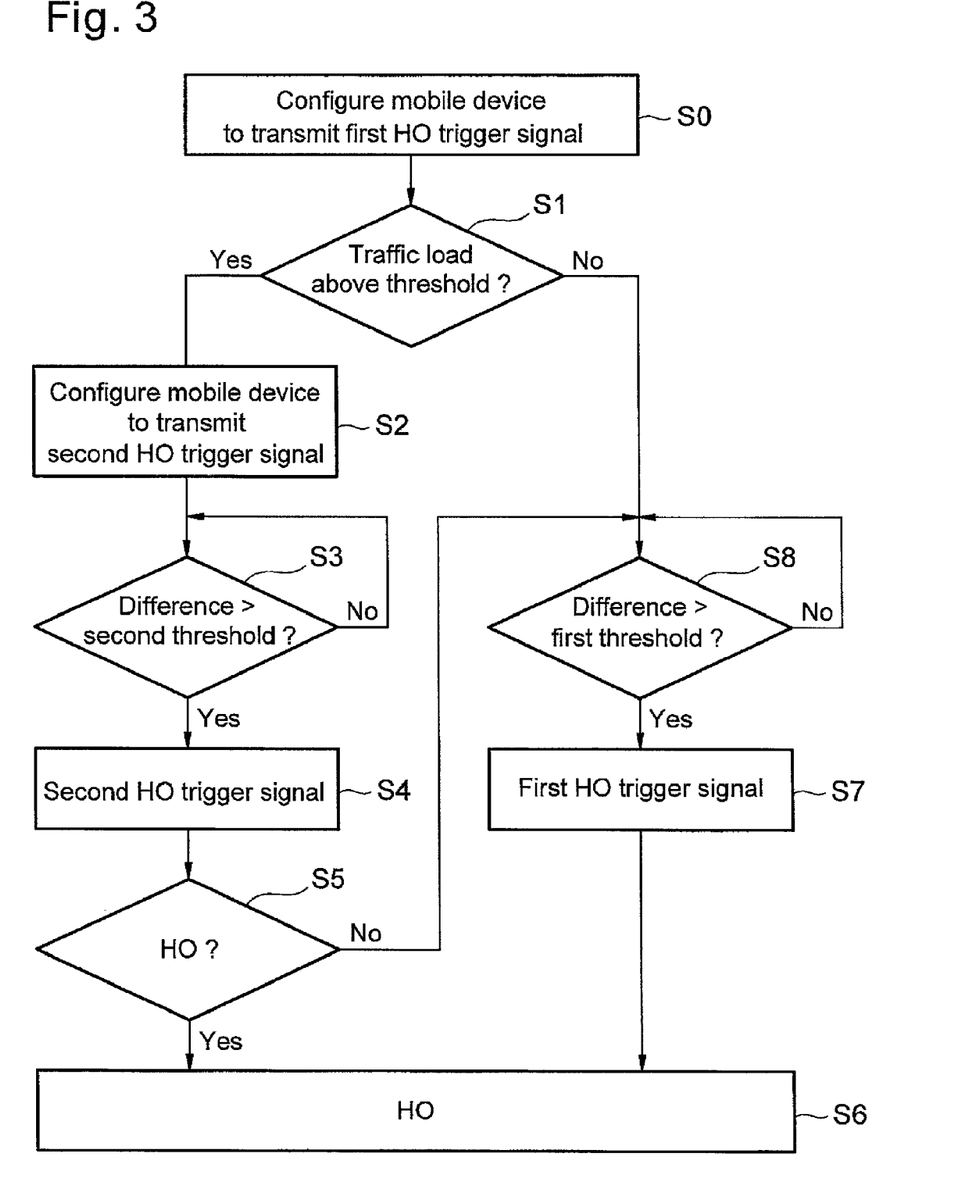
FIG. 3 is a flow diagram of a method according to embodiments of the invention.

FIG. 3 is a flow diagram of a method according to embodiments of the invention. The base station of the source cell configures a mobile device to transmit a first handover trigger signal to the base station of the source cell when a difference between a signal strength of a target cell and a signal strength of the source cell is above a first threshold. The configuring step is referred to in FIG. 3 as step S0.

In step S1 a traffic load in a source cell is determined and it is determined if the traffic load is above a traffic load threshold. If so, the base station of the source cell configures a mobile device to transmit a second handover trigger signal to the base station of the source cell when a difference between a signal strength of a target cell and a signal strength of the source cell is above a second threshold. The configuring step is referred to in FIG. 3 as step S2.

In step S3 it is determined if the difference between the signal strength of the target cell and the signal strength of the source cell is above a second threshold. The signal strengths are both measured by the mobile device. If so, a second handover trigger signal is transmitted from the mobile device to the base station of the source cell in step S4. Subsequently in step S5 it is determined by the base station of the source cell if a handover of the mobile device from the source cell to the target cell shall be performed in step S5. When the base station determines to perform the handover, the handover is performed in step S6. When the decision in step S3 is negative, the mobile device enters again step S3.

When the decisions in steps S1 and S5 are negative, within S8 it is determined if the difference between the signal strength of the target cell and the signal strength of the source cell is above a first threshold. The signal strengths are both measured by the mobile device. If so, a first handover trigger signal is transmitted from the mobile device to the base station of the source cell in step S7 and subsequently the handover is performed in step S6. When the decision in step S8 is negative, the mobile device enters again step S8.

| List of reference numerals | |
|---|---|
| 100 | Second threshold |
| 102 | Time point for second handover trigger signal |
| 104 | Time period |
| 105 | First threshold |
| 106 | Time period for first handover trigger signal |
| 107 | Handover command |
| 108 | Handover command |
| 200 | Base station apparatus |
| 204 | Processor |
| 206 | Data storage |
| 208 | Program instructions |
| 210 | Antenna |
| 212 | Interface |

The invention claimed is:

1. A method for performing a handover of a mobile device from a source cell to a target cell in a cellular wireless telecommunication network, the method comprising:
configuring the mobile device to transmit a first handover trigger signal to the source cell, when a difference between a signal strength of the target cell and a signal strength of the source cell as measured by the mobile device is above a first threshold;
determining traffic load in the source cell;
in response to the cell traffic load in the source cell being above a cell traffic load threshold, in addition to the configuration regarding the first handover signal and the first threshold, configuring the mobile device to transmit a second handover trigger signal to the source cell, in response to a difference between a signal strength of the target cell and a signal strength of the source cell as measured by the mobile device being above a second threshold, wherein the first threshold is larger than the second threshold;
storing information about the mobile device that the handover has been performed from the source cell to the target cell after reception of the second handover trigger signal, in response to the handover being performed from the source cell to the target cell after reception of the second handover trigger signal, thereby recording an indication that the handover from the source cell to the target cell has occurred; and
making a further handover of the mobile device from the target cell back to the source cell less likely based on the recorded indication.

2. The method according to claim 1, wherein the method further comprises:
determining a mobile device traffic load generated by the mobile device in the source cell;
determining if the mobile device traffic load is higher than a mobile device traffic load threshold; and
performing a handover of the mobile device from the source cell to the target cell, if the mobile device traffic load is higher than the mobile device traffic load threshold, when the second handover trigger signal is received by the source cell.

3. The method according to claim 2, wherein the mobile device traffic load is determined by a minimum bit rate required by the mobile device.

4. The method according to claim 1, wherein the second handover trigger signal is indicative of at least one cell being located in the vicinity of the mobile device, the at least one cell comprising the target cell.

5. The method according to claim 1, wherein a location of the mobile device is determined by the source cell and wherein the second handover trigger signal is transmitted only if the location of the mobile device lies outside of a centre region of the source cell.

6. The method according to claim 1, wherein the second threshold is increased when the cell traffic load in the source cell decreases, and wherein the second threshold is decreased when the cell traffic load in the source cell increases.

7. The method according to claim 1, wherein the cell traffic load in the source cell is determined by using weighting factors for scheduling a plurality of mobile devices in the source cell, the plurality of mobile devices comprising the mobile device, wherein the weighting factors for scheduling said mobile devices are dependent on a relation of a required minimum bit rate to a transmission bit rate of the mobile devices or dependent on a ratio of the required minimum bit rate and the transmission bit rate of the mobile devices.

8. The method according to claim 1, the method comprising further:
determining resources used by the mobile device;
determining if the used resources exceed a resource threshold;
performing a handover of the mobile device from the source cell to the target cell, if the used resources exceed a resource threshold, when the second handover trigger signal is received by the source cell.

9. The method according to claim 1, wherein the information is generated by the source cell, stored in a base station of the source cell, transmitted from the source cell to the target cell and stored in a base station of the target radio cell.

10. The method according to claim 1, wherein the information is stored in the mobile device, and wherein the information is transmitted from the mobile device to the target cell.

11. The method according to claim 9, wherein the information is transmitted in a history list of the mobile device, and wherein the handover from the target cell back to the source cell is made less likely if the second last visited cell in the history list is the source cell.

12. The method according to claim 1, wherein additional information is transmitted during the handover procedure triggered by the second handover trigger signal from the source cell to the target cell, the additional information comprising:
the second threshold, and/or
the traffic load in the source cell;
wherein the target cell determines to accept the handover using the second threshold and/or the traffic load in the source cell.

13. A base station apparatus comprising:
a processor configured to
configure an associated mobile device to transmit a first handover trigger signal to a source cell being served by the base station apparatus, when a difference between a signal strength of an associated target cell and a signal strength of the source cell as measured by the mobile device is above a first threshold;
receive the first handover trigger signal from the mobile device;
determine a cell traffic load in the source cell;

in response to the cell traffic in the source cell being above a cell traffic threshold, in addition to the configuration regarding the first handover signal and the first threshold, configure the mobile device to transmit a second handover trigger signal to the source cell in response to a difference between a signal strength of the target cell and a signal strength of the source cell as measured by the mobile device being above a second threshold, wherein the first threshold is larger than the second threshold;

receive the second handover trigger signal from the mobile device; and, store information about the mobile device that the handover has been performed from the source cell to the target cell after reception of the second handover trigger signal, in the case that the handover has been performed from the source cell to the target cell after reception of the second handover trigger signal, thereby recording an indication that the handover from the source cell to the target cell has occurred; and make a further handover of the mobile device from the target cell back to the source cell less likely based on the recorded indication.

14. A non-transient computer-readable storage medium comprising instructions that when executed by a base station apparatus cause the base station apparatus to perform the following:

configuring an associated mobile device to transmit a first handover trigger signal to a source cell served by the base station, when a difference between a signal strength of an associated target cell and a signal strength of the source cell as measured by the mobile device is above a first threshold;

determining a cell traffic load in the source cell;

in response to the cell traffic load in the source cell being above a cell traffic threshold, in addition to the configuration regarding the first handover and first threshold, configuring the mobile device to transmit a second handover trigger signal to the source cell, in response to a difference between a signal strength of the target cell and a signal strength of the source cell as measured by the mobile device being above a second threshold, wherein the first threshold is larger than the second threshold; and, storing information about the mobile device that the handover has been performed from the source cell to the target cell after reception of the second handover trigger signal, in response to the handover being performed from the source cell to the target cell after reception of the second handover trigger signal, thereby recording an indication that the handover from the source cell to the target cell has occurred; and making a further handover of the mobile device from the target cell back to the source cell less likely based on the recorded indication.

* * * * *